(12) United States Patent
Leijonhufvud

(10) Patent No.: US 8,023,629 B2
(45) Date of Patent: Sep. 20, 2011

(54) METHOD FOR ESTABLISHING A CALL

(75) Inventor: Carl Leijonhufvud, Uppsala (SE)

(73) Assignee: AB Aurora Invest, Uppsala (SE)

( * ) Notice: Subject to any disclaimer, the term of this patent is extended or adjusted under 35 U.S.C. 154(b) by 497 days.

(21) Appl. No.: 11/577,977

(22) PCT Filed: Oct. 12, 2005

(86) PCT No.: PCT/SE2005/001513

§ 371 (c)(1),
(2), (4) Date: Mar. 17, 2009

(87) PCT Pub. No.: WO2006/052178

PCT Pub. Date: May 18, 2006

(65) Prior Publication Data

US 2009/0196409 A1 Aug. 6, 2009

(30) Foreign Application Priority Data

Nov. 11, 2004 (SE) .................................. 0402747

(51) Int. Cl.
*H04M 3/00* (2006.01)

(52) U.S. Cl. ........ 379/198; 379/229; 379/231; 379/232; 379/233; 379/234

(58) Field of Classification Search ............. 379/88.03, 379/215.01, 219, 201.03; 709/223, 224, 709/246
See application file for complete search history.

(56) References Cited

U.S. PATENT DOCUMENTS 5,268,958 A * 12/1993 Nakano .......................... 379/246
6,393,481 B1 * 5/2002 Deo et al. ....................... 709/224
6,546,083 B1 * 4/2003 Chaves et al. ............... 379/88.03
6,560,222 B1    5/2003 Pounds et al.
6,633,848 B1   10/2003 Johnson et al.
2002/0064275 A1  5/2002 Tatsumi
2003/0147381 A1  8/2003 Nelson et al.
2003/0147382 A1* 8/2003 Neuman ........................ 370/352
2005/0021713 A1* 1/2005 Dugan et al. .................. 709/223

FOREIGN PATENT DOCUMENTS

JP   2001268236 A   9/2001
JP   2002315028 A  10/2002
JP   2004153544 A   5/2004

OTHER PUBLICATIONS

Notification Concerning Transmittal of International Preliminary Report on Patentability (Chapter I of the Patent Cooperation Treaty), May 24, 2007.
Russian Office Action dated Nov. 25, 2009.
Roslyakov A.V. Samsonov M. Yu., Shibaeva I.V. "Services Centers for Calls (Call Centre)", Moscow 2002 (L1) p. 26, I. 29-p.27, I. 16.
Galichskiy K.V. "Computer Systems in Telephony", St. Petersburg, BHV-Petersburg, 2002 (L2) (p. 79, I. 1-5).
Translation of Action from Japanese Patent Office.

* cited by examiner

*Primary Examiner* — Curtis Kuntz
*Assistant Examiner* — Joseph J Nguyen
(74) *Attorney, Agent, or Firm* — Holland & Hart LLP

(57) ABSTRACT

The present invention relates to a method for establishing a call from a calling party to an extension of a PBX. By providing the calling party with a graphical display of information of extension of the PBX the user may easy and fast select a desired extension.

11 Claims, 3 Drawing Sheets

METHOD FOR ESTABLISHING A CALL

FIELD OF INVENTION

The present invention relates generally to establishing of calls. Particularly the present invention relates to a method for establishing a call from a calling party via a private branch exchange to an extension of the private branch exchange.

BACKGROUND

Today it is getting increasingly more usual to be offered connection alternatives when you call companies or authorities, to implement automatic connection of extensions. The user then chooses one of the offered alternatives by pressing a button on a phone, so called DTMF signaling, or by speaking into a phone, so called voice control. After a first such choice you are commonly offered further alternatives until you finally is connected to an intended extension of the private branch exchange (PBX) of the company or the authority.

A problem with such automatic connections is that it could be frustrating to listen to a lot of alternatives, even more if in several steps, as well as if you pick a wrong alternative you will probably need to start all over by calling the company or the authority again. In other words, a problem with such automatic connections is that a lot of selections need to be transferred between the PBX of the company, or the authority, and the calling party.

SUMMARY OF THE INVENTION

An object with the present invention is to provide a method for establishing a call from a calling party to an extension of a private branch exchange, which method facilitates the establishment of such a call.

This object, among others, is according to the present invention attained by methods according to the appended claims.

An advantage according to the present invention is that a graphical display of several alternatives allows more information to be processed faster by the calling party, as well as allowing one selection of alternative to be used to choose an extension positioned several steps down in a hierarchy of said information.

Another advantage, according to a second embodiment of the present invention, is that with graphically displayed information even further information is readily accessible, as well as allowing the possibility to traverse displayed information up and down in a hierarchy.

Further features and advantages of the present invention will be evident from the following description.

BRIEF DESCRIPTION OF THE DRAWINGS

The present invention will become more fully understood from the detailed description of embodiments given below and the accompanying figures, which are given by way of illustration only, and thus, are not limitative of the present invention, wherein.

DETAILED DESCRIPTION OF EMBODIMENTS

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

Figure 1:
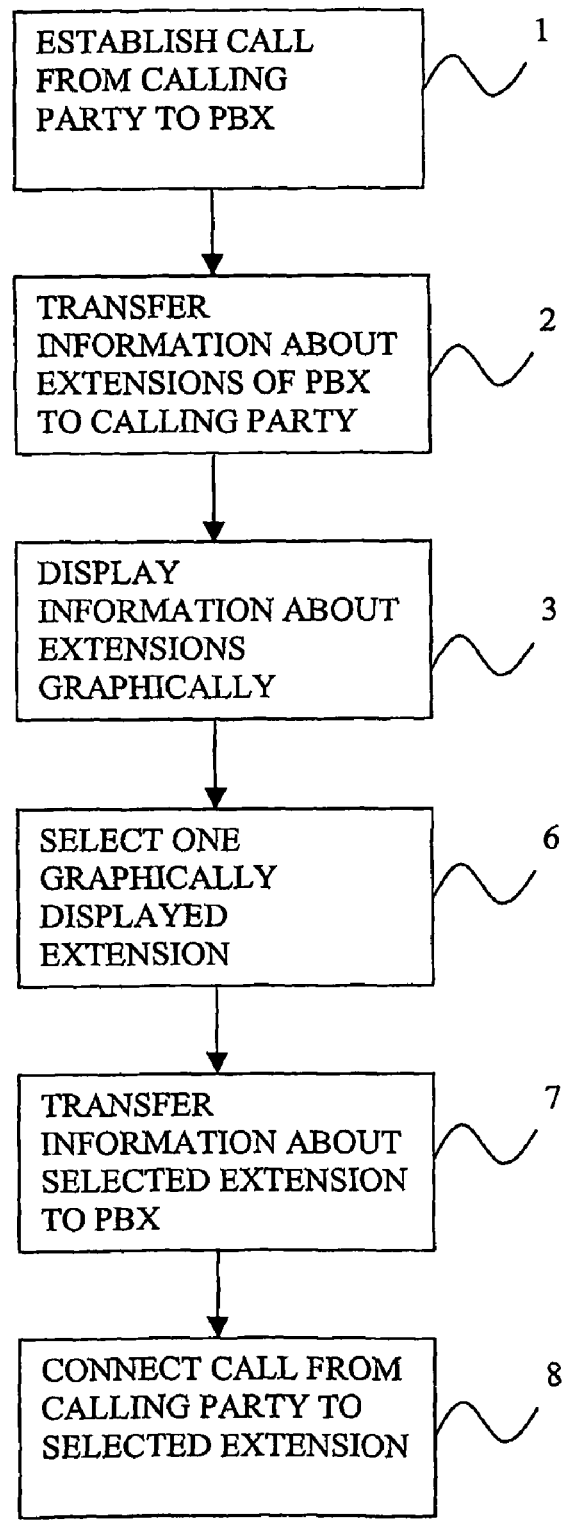
FIG. 1 schematically illustrates the steps of a method according to a first embodiment of the present invention.
Figure 2:
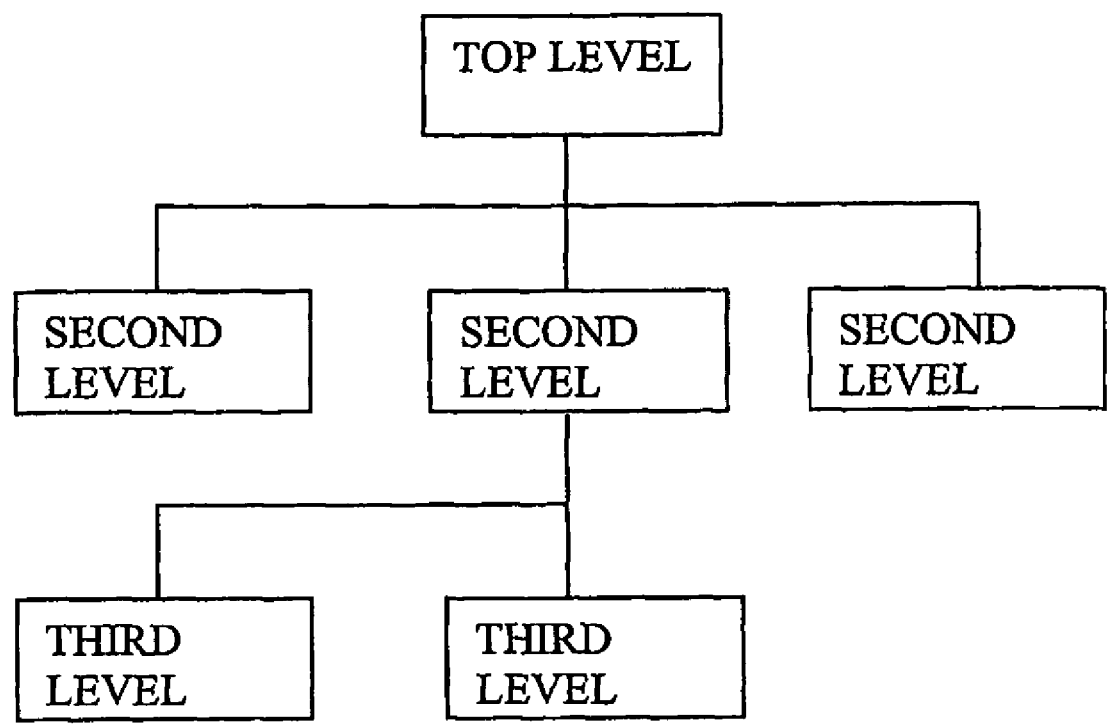
FIG. 2 schematically illustrates a graphical display of extensions according to the first embodiment of the present invention.

A first embodiment of the present invention will now be described with reference to FIGS. 1 and 2.

A user having a graphical interface in connection with a telephone subscription may utilize the present invention. Examples of possible such arrangements are: a mobile phone; a cordless telephone; or a softphone on a computer.

A calling party establishes 1 a call to a PBX (private branch exchange) of e.g. a company or authority. The PBX receives a request, from the calling party, of information about extensions of the PBX. The PBX transmits 2 the requested information to the calling party. Information about the extensions of the PBX is graphically displayed 3 to the user. The user selects one of the graphically displayed extensions 6. Information of which extension the user has selected is transmitted to the PBX 7. The PBX receives the information about the selected extension and connects the call to the selected extension 8.

The information graphically displayed to the user may be composed in a plurality of ways. Readily accessible information is for instance obtained by presenting the extensions as nodes in a hierarchy, as illustrated in FIG. 2. For a company directed to consumers the top level e.g. presents the owner of the PBX. The second level presents different functions, such as: mobile telephony, line telephony, and operator. The third level presents e.g. more detailed descriptions of possible choices, such as: invoice questions, and technical support.

Alternatively, for a company directed to other companies the top level e.g. presents the owner of the PBX. The second level presents different divisions, such as: manufacturing, core functions, and economics. The third level presents e.g. more detailed descriptions of choices, such as: information responsible, and CEO.

Extensions of the PBX generally only exist in end nodes, such as the described operators, invoice questions, and CEO. Nodes above end nodes are generally only of informative nature to build an information picture of what each extension provides.

The user may thus directly select one of the extensions, regardless of which level of hierarchy it belongs to. The selection may e.g. be performed by mouse clicking on an extension, pointing on a touch screen, or by voice control. A click on a hyperlink is preferably used to select a node. Although three levels have been used to illustrate this embodiment, any number of levels may be used.

The information transfer between the PBX and the calling party may advantageously be performed via a web page, preferably through a proxy server to allow the calling party to tag this web page for future further use. The PBX then needs to be able to link the established call with information transfer on that web page.

Figure 3:
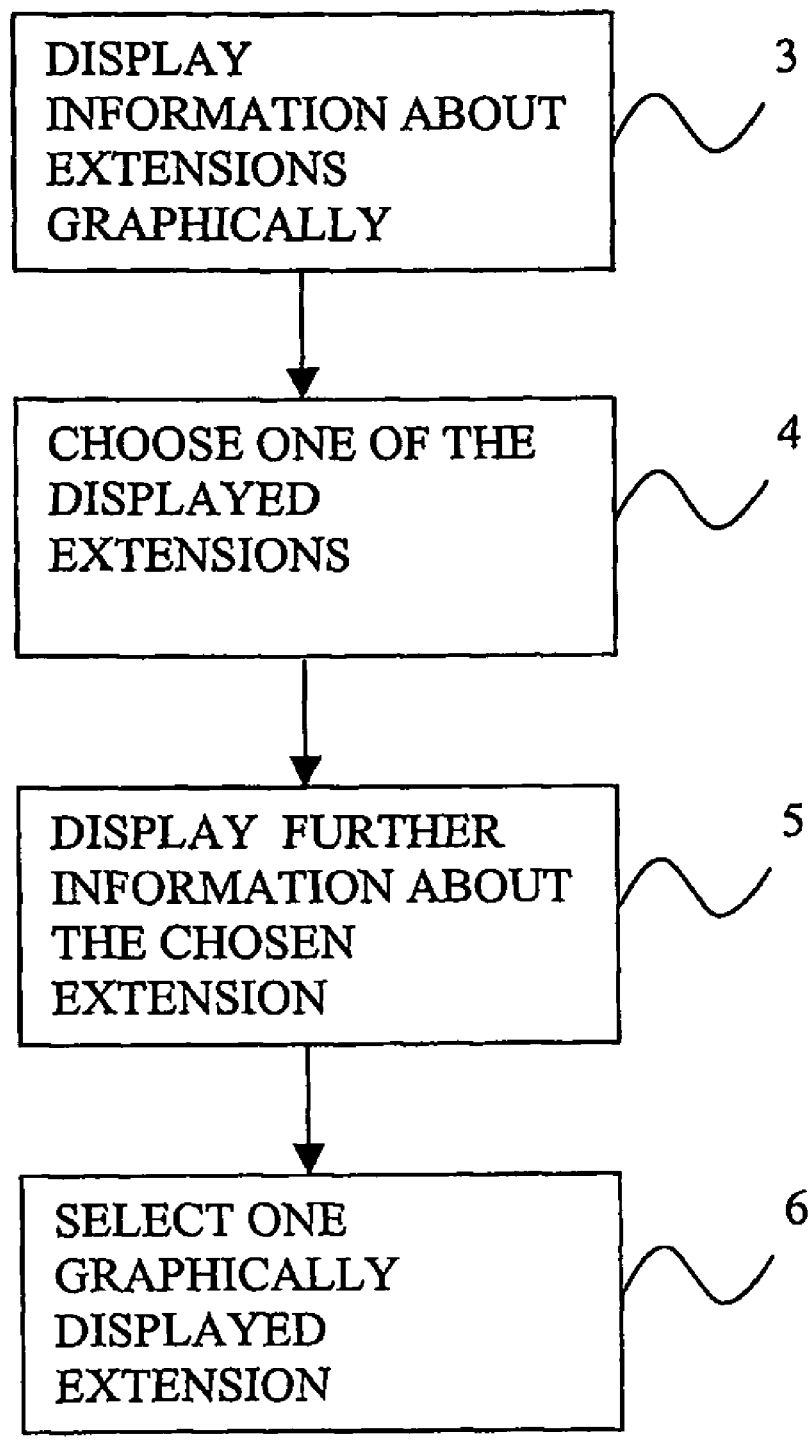
FIG. 3 schematically illustrates additional steps of a method according to a second embodiment of the present invention.

A second embodiment of the present invention will next be described with reference to FIG. 3. This second embodiment is identical to the first embodiment of the present invention described above apart from the following.

After the information about the extensions of the PBX has been graphically displayed to the user 3 he may alternatively choose a node 4 instead of selecting a node. Choosing of a node 4 will display further information 5 for the calling party, additional to the information already displayed to the calling party. This is to advantage, as the information displayed for each node in the general picture will have limited space, whereas the further information, obtained by choosing a node, may utilize much more space of the display. Preferably the further information is accessed by a hyperlink different from the hyperlink for selection of the node, wherein both hyperlinks are displayed in the node. The general information may e.g. be the name of the reception function. The further information may e.g. comprise information about presence, availability, number of queuing persons, estimated waiting time until connection, and reference to an alternative extension.

The choosing of node may alternatively e.g. be performed by mouse clicking on an extension, pointing on a touch screen, or by voice control. To differentiate between selection of a node and choosing of a node without having different hyperlinks e.g. left and right clicking of a mouse be utilized. Another alternative to display further information about a node is to keep a pointer, e.g. a mouse pointer, still over a desired node.

If one level of nodes comprises a number of support operators the general information for each operator could comprise an identification of each operator, e.g. the first name of the operator, and the number of persons in queue to that operator. This gives the calling party the possibility to choose what he believes is the shortest queue, or an operator he has spoken to earlier. This would be possible if the PBX allows individual queues. Otherwise the more common way is a general queue to the first available operator of a plurality of operators, which may be a separate node e.g. one level up in the presented hierarchy. By providing the general queue in a separate node the user is given the choice of either selecting a specific operator or the general queue. A preferred feature in connection with queuing is that after a predefined period of time of queuing the call is disconnected.

The user may thereafter choose another node higher up, lower down, or in the same level, in the displayed hierarchy to get further information about that node. When the user is satisfied with which node he wants to connect to he selects that node.

Another alternative for selection of queue is the possibility to select several extensions. When the user gets connected to one extension the user is removed from the other queues. In connection with selection of several extensions it is preferably also possible to set a preferred priority between the different extensions. The user thus states a period of time, how long he is prepared to wait for the extension with the highest priority, e.g. five minutes. If the user during that period of time is in position to be connected to an extension with lower priority he is not connected to that extension but is moved one step back in that queue. If the user has not been connected to the extension with the highest priority during the stated period of time, the priority is lowered to the second highest priority, thus making the user eligible for connection to more of the selected extensions.

It will be obvious that the present invention may be varied in a plurality of ways. Such variations are not to be regarded as departure from the scope of the present invention. All such variations as would be obvious for a person skilled in the art are intended to be included within the scope of the appended claims. One such variation is that the user may select more than one extension, and when the user is connected to one of the selected extensions queuing to the other selected extensions are removed.

The invention claimed is:

1. A method for establishing a call from a calling party via a private branch exchange to an extension of said private branch exchange, said method comprising the following steps:
   firstly establishing a call from said calling party to said private branch exchange; and thereafter said method comprises:
   transmitting to said calling party information of a plurality of extensions of said private branch exchange;
   displaying at least two of said plurality of extensions graphically to said calling party;
   selecting at least one of the displayed extensions; and
   receiving said selection in order for said private branch exchange to queue said call to said selected at least one extension.

2. The method as claimed in claim 1, comprising the following additional steps:
   choosing one of the displayed extensions; and
   displaying information of said chosen extension to said calling party.

3. The method as claimed in claim 1, wherein said step of selecting comprises selecting at least two of the displayed extensions, and said step of receiving comprises queuing said call to said selected at least two extensions.

4. The method as claimed in claim 3, comprising the following additional steps:
   connecting said call to one of the extensions said calling party is queuing to, when said calling party is in position to be connected to this extension; and
   removing said calling party from the other extension queues that said calling party is queuing to.

5. The method as claimed in claim 3, wherein each of said queue to an extension is given a priority.

6. The method as claimed in claim 5, wherein each priority is given a time out.

7. The method as claimed in claim 6, comprising the following additional steps:
   checking if one of the extensions said calling party is queuing to has the highest priority, when said calling party is in position to be connected to this extension,
   if this extension has the highest priority the following steps are performed:
   connecting said call to this extension; and
   removing said calling party from the other extension queues that said calling party is queuing to;
   if this extension has a priority lower than the highest priority the following step is performed:
   moving said calling party one step back in the queue to this extension; and
   lowering the highest priority to equal the second highest priority, when the highest priority has timed out.

8. A method for establishing a call from a calling party via a private branch exchange to an extension of said private branch exchange, said method comprising the following steps:
   firstly establishing a call from said calling party to said private branch exchange; and thereafter said method comprises:
   transmitting to said calling party information of a plurality of extensions of said private branch exchange;
   displaying at least two of said plurality of extensions graphically to said calling party;
   selecting one of the displayed extensions; and receiving said selection in order for said private branch exchange to connect said call to said selected extension.

9. The method as claimed in claim 8, comprising the following additional steps:
choosing one of the displayed extensions; and
displaying information of said chosen extension to said calling party.

10. The method as claimed in claim 8, wherein said step of displaying at least two of said plurality of extensions graphically comprises displaying said plurality of extensions in a plurality of hierarchal levels.

11. A method for establishing a call from a calling party via a private branch exchange to an extension comprising the following steps:

firstly establishing a call from said calling party to said private branch exchange; and thereafter said method comprises:
receiving information of a plurality of extensions of said private branch exchange;
displaying at least some of said plurality of extensions graphically to said calling party;
selecting one of the displayed extensions; and
transmitting to said private branch exchange said selection in order for said private branch exchange to connect said call to said selected extension.

* * * * *